March 4, 1958

L. KULL 2,825,401

AUTOMATIC TIME SWITCH

Filed Jan. 19, 1953

Leo Kull
*INVENTOR.*

BY *Clarence A. O'Brien
and Harvey B. Jacobson*
Attorneys

March 4, 1958

L. KULL 2,825,401

AUTOMATIC TIME SWITCH

Filed Jan. 19, 1953

Leo Kull
INVENTOR.

March 4, 1958 L. KULL 2,825,401
AUTOMATIC TIME SWITCH
Filed Jan. 19, 1953 6 Sheets-Sheet 3

Leo Kull
INVENTOR.

March 4, 1958

L. KULL 2,825,401

AUTOMATIC TIME SWITCH

Filed Jan. 19, 1953

Leo Kull
INVENTOR.

BY *Clarence A. O'Brien*
*and Harvey B. Jacobson*
Attorneys

March 4, 1958 L. KULL 2,825,401
AUTOMATIC TIME SWITCH
Filed Jan. 19, 1953 6 Sheets-Sheet 5

Leo Kull
INVENTOR.

BY *Clarence A. O'Brien*
and *Harvey B. Jacobson*
Attorneys

March 4, 1958 L. KULL 2,825,401
AUTOMATIC TIME SWITCH
Filed Jan. 19, 1953 6 Sheets-Sheet 6

Leo Kull
INVENTOR.

BY Clarence A. O'Brien
and Harvey B. Jacobson
Attorneys

United States Patent Office 2,825,401
Patented Mar. 4, 1958

2,825,401
AUTOMATIC TIME SWITCH

Leo Kull, Harrison, N. J.

Application January 19, 1953, Serial No. 332,069

2 Claims. (Cl. 161—1)

This invention relates to time switches combined with or incorporated within a clock mechanism and more particularly to an electrical switching mechanism operated by clockwork.

One of the more desirable and important features of the invention resides in the design of the clock face and the function controlling scale which is such as to be easily perceived and understood by any user. The presetting of times for operation does not require any complicated adjustment and no separate scales are used for any time setting purposes.

This time switch is designed in scale with conventional alarm clocks and may be used concurrently or independently as a time switch and as an ordinary clock.

There is a wide variety of the uses for this switch timer. The first form of the invention is especially designed for automatically operating household electrical appliances with applications being exemplified by the time control of cooking in electric and gas ranges, automatic defrosting of electric refrigerators, the automatic shifting of temperature setting in house heating controls or thermostats, and timed automatic excitation of radios.

The second described type of my invention is particularly adapted for the automatic excitation of store window display lights, bill-board and advertising lights as well as for many timed operations of suitable production machines.

By connecting two or more of these time switches to each other, there can be obtained additional switch functions in a given period as may be necessary for special applications.

These, together with the various ancillary objects and features of the invention which will become apparent as the following description proceeds, are attained by this time switch, preferred embodiments of which have been illustrated in the accompanying drawings, by way of example only, wherein.

Figure 5:
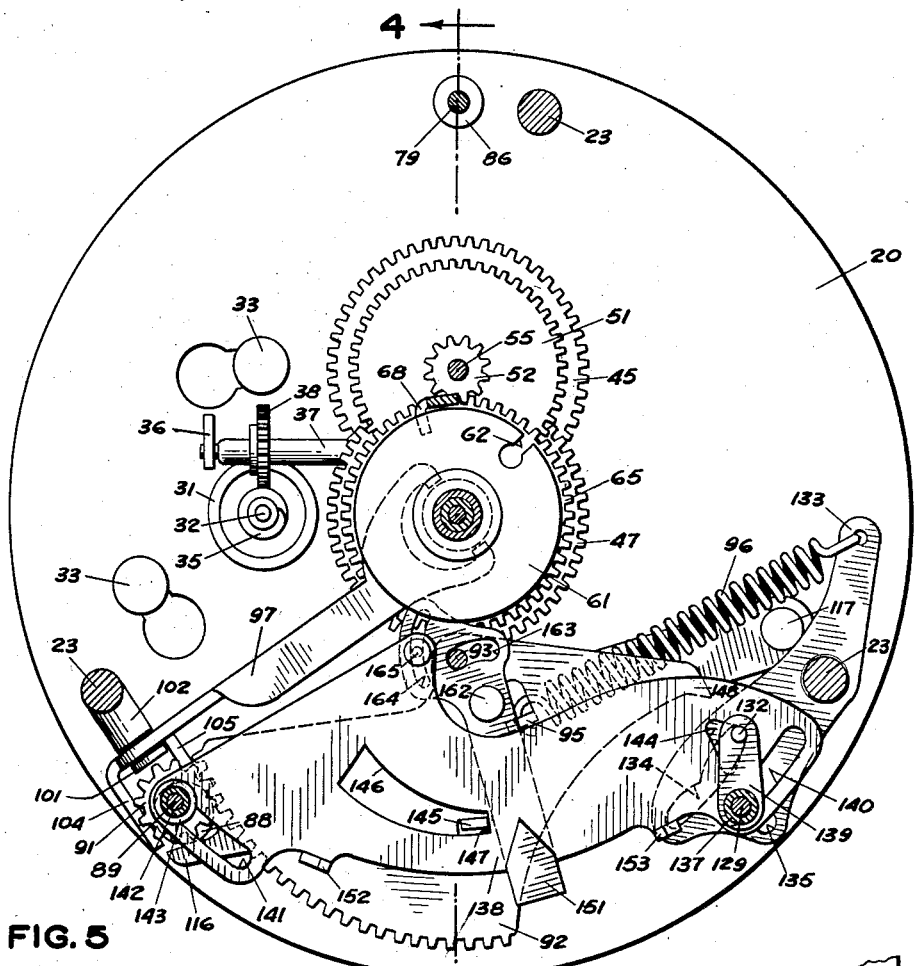
Figure 5 is an enlarged sectional view, taken along the plane of line 5—5 of Figure 4, showing part of the operating mechanism in elevation and pointer in a position, indicating "off" as in Figure 1.
Figure 6:
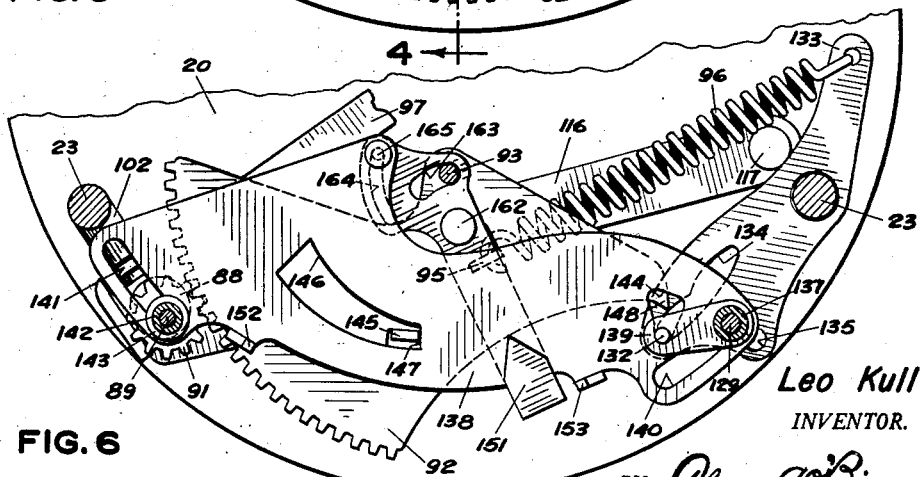
Figure 6 is an enlarged fragmentary view in elevation, similar to Figure 5, showing controlling mechanism in a position with the pointer indicating "on"
Figure 7:
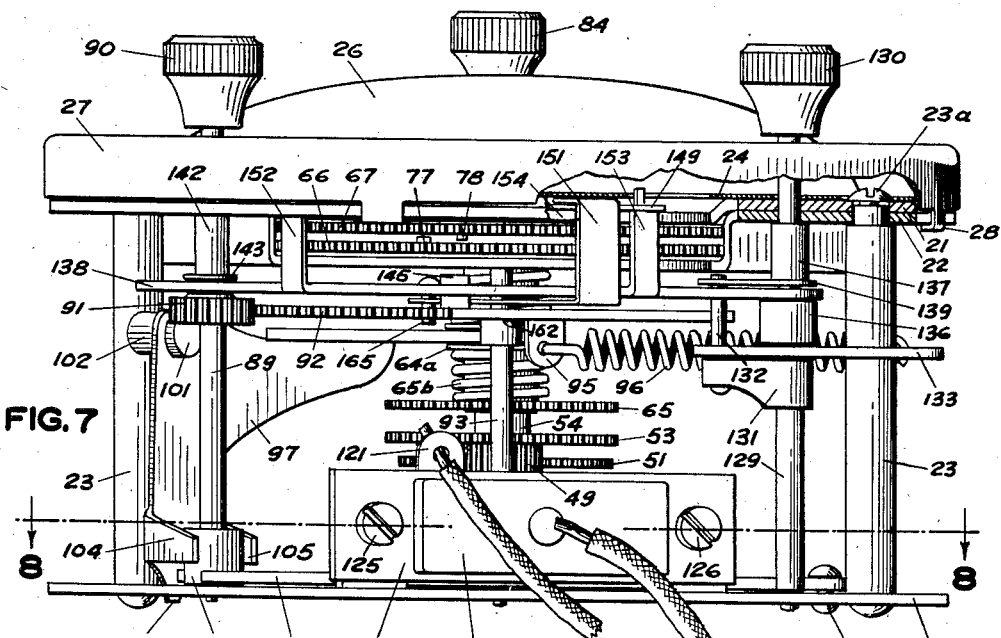
Figure 7 is a bottom plan view with the clock motor removed and with parts being shown in section for greater detail.
Figure 8:
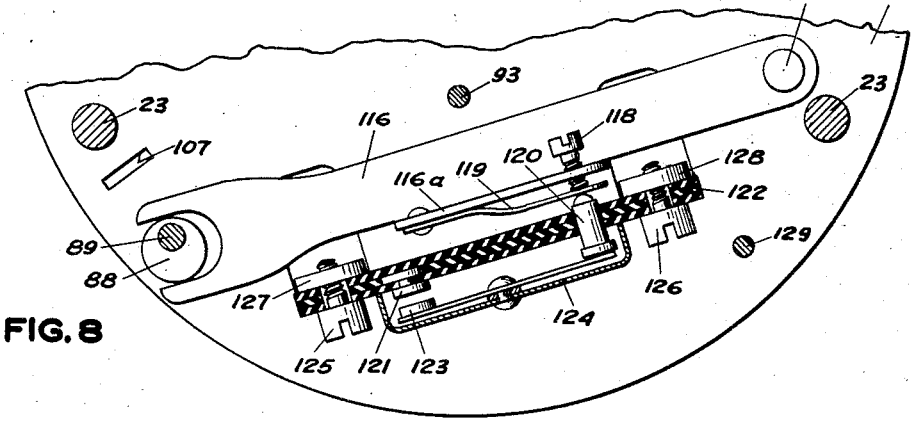
Figure 8 is an enlarged view illustrating the microswitch in section and switch operating lever with its actuating eccentric forming elements of this invention.

With continuing reference to the accompanying drawings wherein like reference numerals designate similar parts throughout the various views and with particular reference initially to Figures 1-8, it will be noted that the time clock comprises a substantially circular rear frame plate 20 and the front portion thereof comprises a circular plate 21 having a large circular aperture therethrough. Another frame plate 22 is positioned behind the plate 21. Frame plates 20, 21 and 22 are held in spaced parallel relationship by a plurality of posts or studs 23. One end of each post or stud 23 is riveted to the plate 20 and the other end thereof is reduced in diameter to pass through plates 21 and 22. Each post 23 has a threaded hole for screws 23a which clamp plates 21 and 22 against the shoulders formed by such reduction in diameter. (Figure 7.)

The frame plate 21 at the front of the clock is covered with a relatively thin sheet 24 forming a clock face upon which appropriate indicia for designating twelve hours and appropriate sub-divisions thereof is applied, and over which travel the hands of the time clock in the usual and customary manner. The material of the clock face can be formed from a cellophane sheet forming circular transparent window 25 showing therethrough timing sectors. The remaining portion of clock face 24 is coated, to form an opaque clock face on which suitable indicia may be applied. The clock face is covered by a convex glass 26 held in place by a substantially annular ring 27, which overlaps and embraces the peripheral marginal edge of the glass 26. The ring 27 is provided with a series of lips 28 turned over the frame plate 22 holding the ring 27 and glass 26 snugly in position.

In the embodiment of the invention illustrated, the time clock mechanism is shown as being actuated by a synchronous electric motor but it is to be understood that such form of actuation is not limiting on the scope of this invention inasmuch as any means of actuating mechanism may be used to drive the time clock.

In the construction illustrated, the electric motor driving the time mechanism comprises a stationary part 29 and a rotating part 30. The stationary part 29 of the clock motor is provided with a concentrically positioned annular boss 31 which surrounds the motor shaft 32 and which fits snugly in an aperture formed into the frame plate 20. The boss 31 holds the stationary part 29 securely in desired position with respect to the frame plate 20 and the motor unit is held in assembled relation thereon by three headed studs 33 passing through the apertures of frame plate 20. The edges of the apertures hold the heads of studs 33 and the unit is held frictionally by a circular spring sheet 34. The shaft 32 of the synchronous motor unit extends through the boss 31 and carries a worm 35. Two brackets 36 hold a transfer shaft 37. To one end of the shaft 37 there is secured a worm gear 38 in mesh with the worm 35 of the motor unit. To the other end of the shaft 37 there is secured a worm 39 in mesh with the gear 40 which is secured to the shaft 41 of second hand 42. Thus, double worm reduction secures the desired speed of rotation, i. e. one R. P. M. to the shaft 41 of second hand 42. The reduced end of the shaft 41 is journaled to an annular bearing bushing 43 secured to the relatively thin rear frame plate 20 affording a clearance between the end of shaft 41 and the clock motor, which is held close to the frame plate 20.

A pinion gear 44 rigidly secured to worm gear 40 drives a gear 45. To the gear 45 there is secured a pinion gear 46 which meshes with and drives a gear 47 on hollow shaft 48 which is journaled concentrically with respect to the shaft 41. The gear 47 frictionally drives a pinion gear 49 mounted on shaft 48. The gear 49 is frictionally held against gear 47 by an annular disc spring 50. The pinion gear 49 drives a gear 51 to which there is secured a pinion gear 52 driving the hour gear 53. The hour gear 53 is secured to a hollow shaft 54 journaled concentrically about the minute shaft 48. The gears 51 and 52 are secured to a shaft 55 the reduced end of which is journaled in an extended bearing bushing 56. Gears 45 and 46 are secured on a hollow shaft 57 moving at a different speed and concentric with the shaft 55. The shoulder of the reduced end of shaft 55 and the end of hollow shaft 57 position these gears axially between frame plates 20 and 22. The end of shaft 55 extends through the frame plate 20 and carries a knob 58. The gear train permits the usual reduction from the second hand gear 44 a 60 to 1 reduction through gears 45 and 46 to minute gear 47 and from the gear 49 a 12 to 1 reduction through gears 51 and 52 to the hour gear 53. The minute gear 47 and its associated pinion 49 are thus held together frictionally by the annular disc spring 50 to permit the manual time setting input from knob 58 to the gear 49 while rotating the minute hand 59 and the hour hand 60 in the usual way.

The time mechanism drives the necessary means causing the desired switch functions to be initiated and terminated at predetermined times. This means comprises a time driven disc 61 having a slot 62 therein which is secured to a hollow shaft 63. The shaft 63 has a shoulder 63a forming supporting surfaces for a pair of washers 64 and 64a which are held in position by coil springs 65a and 65b about the shaft or hub 63. A gear 65 is fitted on hub 63 and engages the gear 52 to drive hub 63 which is axially slidable on shaft 54.

Between two front frame plates 21 and 22 are placed two ring gears 66 and 67 for presetting the desired times for accomplishment of the switch functions. The ring gear 66 has an abutment 68 struck out from the stock thereof and bent as shown on Figure 4. This abutment 68 and a series of small toes 69, struck out from the stock thereof and bent at right angles, form an annular shoulder mounting the gear 66 concentrically rotatable within the aperture in the frame plate 22. The gear 66 is provided with a central opening for reception of sleeve 70 which serves as a bearing sleeve for the main shaft 54 and which is rotatable relative to sleeve 70. The shoulder of the reduced end of the hour hand shaft 54 and the reduced end of second hand shaft 41 hold the main shaft of clockwork axially positioned between frame plate 20 and bearing sleeve 70. To the one end of connecting sleeve 70 there is riveted another abutment 71 and to the other end of the sleeve 70 there is secured a relatively thin annular metal sheet 72. The sleeve 70, abutment 71 and sheet 72 form portions of the ring gear 67 which is further provided with a large hole as shown on Figure 4.

Figure 1:
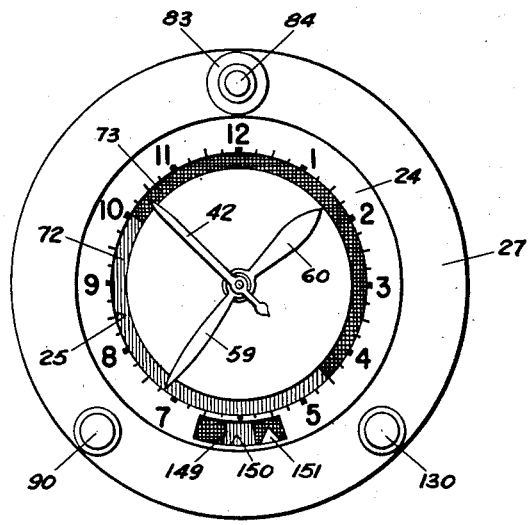
Figure 1 is a front elevational view of the improved timing device comprising the present invention.

For the purpose of predetermining and showing the times of switch function two contrastly different color sectors can be seen through the transparent window 25 as in Figure 1. The two most electrically understandable colors, that is, red and black are preferably used as color sectors with red meaning "on" and black meaning "off". The disc 72 is colored red and for the black disc there is provided a relatively thin metal sheet 73, the center portion of which is secured to the gear 66 using a rivet 74 or any other convenient means. The disc 73 has a half circular slot with a radial split 75 in one end of this slot. The other disc 72 has also a half circular slot with a split portion 76 in one end of the circular slot. The free split end of disc 73 is put through the split 76 of disc 72 as shown on Figure 3. Thus, the relationship between the discs 72 and 73 and hence two color sectors can be changed 360° by turning gears 66 and 67.

Ring gear 66 is provided with a stop piece 77 struck out from the stock thereof and bent at right angles thereto and the ring gear 67 has a similar stop piece 78. These stop pieces 77 and 78 prevent the ring gears 66 and 67 from being turned more than 360° relative to each other while the thickness of the stop pieces 77 and 78 determines the minimum time possible between two switch functions.

The ring gear 66 with the black colored disc 73 and the abutment 68 on the same radial line with the split 75 of the disc 73 form an integral part; and the ring gear 67 with red colored disc 72 and the abutment 71 on the same radial line with the split 76 of the disc 72 form another integral part. These two parts form a unitary rotatable structure though adjustable relative to each other and to clock dial 24. Means are provided for setting the gears 66 and 67 at any desired position and thereby changing their relationship to each other in the extent of approximately 360° and to the clock dial in either direction using knobs 83 and 84 for turning gears 67 and 66, respectively. To a shaft 79 there is secured a pinion gear 80 in mesh with gear 66. Another pinion gear 81 is secured to a hollow shaft 82 concentrically journaled on the shaft 79. The hollow shaft 82 extends through the apertures in frame plate 21 and holding ring 27 and to the shaft 82 there is secured a knurled knob 83 for manually turning the gear 67. The shaft 79 carries a knob 84 for manually turning the gear 66. An opening into the frame plate 22 is provided for gears 80 and 81. A helical spring 85 is mounted on the shaft 79 biasing the frame plate 20 and washer 86 urging the washer 86 against the shoulder of shaft 79. A thin intermediate piece 87 between gears 80 and 81 carried between frame plates 21 and 22 separates gears 80 and 81 and holds these gears frictionally in position by means of the spring 85. By this way each gear 80 or 81 can be turned independently of the other gear or both gears 80 and 81 can be turned together. Of course gears 80 and 81 could be mounted separably each one on its own shaft.

Means are provided to reciprocate the disc 61. This reciprocating motion of the disc 61 is hindered by abutments 68 and 71 until the hindering abutment passes through the slot 62 in the disc 61.

The structure of the invention heretofore described is used in all forms of the device, and in both modifications to be described a lock lever is used, getting its motion from a spring rotated eccentric.

In one form of the invention the functions of the switch are controlled by a controlling mechanism which is manually operated by two knobs. The switch can be turned to a desired position and one or two (as desired) switch functions can occur automatically at predetermined times, with manual tensioning of the spring. In the second case the function causing spring is tensioned by clockwork continuously and in a clock dial period two switch functions are occuring continuously at predetermined times.

An eccentric 88 is provided for causing a reciprocating motion. This eccentric is secured to a shaft 89, the reduced end of which is journalled in frame plate 20 and the other end of shaft 89 extends through the front frame plates 21 and 22 and glass holding ring 27. To the front end of shaft 89 there is secured a knurled knob 90 for manually turning the shaft 89. To the shaft 89 there is secured a gear 91 in mesh with a sector gear 92 with a ratio 8:1. The sector gear 92 is secured to a shaft 93, both ends of which are journalled in the frame plates 20 and 22. There is riveted to the frame plate 22 a bushing 94 to form a longer bearing for the front end of shaft 93 without hindering ring gear 66 which is lying closely against the frame plate 22. To the hole of a toe 95, struck out from the stock of sector gear 92 and bent perpendicularly thereto is fastened a helical spring 96 adapted to pull the sector gear 92 and so to rotate the gear 91 with eccentric 88.

A fork lever 97 is used to transfer the reciprocating motion produced by the eccentric 88 to the disc 61. The lever 97 is pivotally secured to the post 23 by a rivet or screw 101 and is engaged between washers 64 and 64a. A hollow distance piece 102 on the reduced end of rivet 101 holds the lever 97 axially positioned on the rivet 101. Two parallel faces 104 and 105 of lever 97 are bent over at right angles from the stock of lever 97 and engage the eccentric 88. A toe 106 in a rectangularly shaped opening 107 cut into frame plate 20, holds this end in desired position.

Manually turning the knob 90 operates to turn the lever 97 which will turn sector gear 92 so as to tension spring 96 thus reciprocating lever 97. This reciprocation is transferred by lever 97 to the disc 61. The path of eccentric 88 is hindered by abutments 68 and 71 and to overpass this hindrance, springs 65a and 65b permit only the lever 97 to move. After tensioning the spring 96 in this manner and leaving knob 90 free, tension of spring 96 will be maintained by abutment 68 or 71. Thus springs 65a and 65b must be strong enough to withstand the force exerted by the spring 96. Only when the abutment passes through the slot 62 in the disc 61 will the disc be free to move.

Means are provided to operate an electric micro-switch using a gradual 180° motion of eccentric 88 as a reciprocator of a lever 116 for operating the micro-switch. The eccentric end of lever 116 is engaged at one end with eccentric 88 and at the other end is pivotally secured to frame plate 20 using a headed stub rivet 117. The center line of lever 116 is at right angles to a line through the center points of eccentric 88 taken in its standing positions. The middle portion of the lever 116 is bent at right angles to form a supporting flange 116a for an adjusting screw 118 and for a flat spring 119 which is riveted to the flange 116a. The free end of spring 119 presses against the adjusting screw 118 and is adjustable by turning the screw 118 in relation to lever flange 116a. The flat face of spring 119 beyond the adjusting screw 118 actuates a knob 120 of the micro-switch, the knob 120 being made from an insulating material. The micro-switch, as generally used, comprises a contact 121 between insulating plates 122 and a spring contact 123 which is riveted to a metal box 124 secured to insulating plates 122. Normally the two contacts 121 and 123 are closed. When the spring 119 pushes the knob 120 the contacts 121 and 123 are opened as is the circuit controlled thereby. Two screws 125 and 126 are used to fasten the micro-switch through apertures in the insulating plates 122 to supporting lugs 127 and 128, the lugs being struck out from the stock of frame plate 20 and bent normal thereto as shown on Figure 8.

By turning manually knob 90, spring 96 will be tensioned as described before. The path of the eccentric 88 is hindered by lug 104 or 105 of lever 97 if the disc 61 is hindered by either abutment 68 or 71. When the abutment passes through the slot 62 of disc 61 this frees eccentric 88 for 180° of motion, which causes lever 116 to respond pushing in the knob 120 of the micro-switch or letting it free.

Means are provided to determine the extent of movement of the sector gear 92 suitable for causing one and one-half revolutions to the gear 91 and eccentric 88. This will enable the switch to change three times in its setting while eccentric 88 is making one and one-half revolutions. Choosing the first switch position ON there would follow "off"-"on"-"off." From these four (on-off-on-off) a controlling mechanism eliminates the first position or the last position: switch being "off" turns automatically "on" and then "off"; or switch being "on" turns automatically "off" and then "on."

Means are provided to shift a plate to determine these two groups of switch functions. A pivoting shaft 129 is provided and the reduced end of shaft 129 is journalled in an aperture of frame plate 20 and the other end of the shaft 129 extends through the frame plates 21 and 22 and holding ring 27 and carries a knurled knob 130 for manual turning. To the shaft 129 there is secured an arm 131 carrying a pivoting pin 132. There is further provided a locking lever 133 holding the pivoting arm 131 in an urged position as shown on Figure 5 or Figure 6. Locking lever 133, having a hole in it is pivotally secured to the post 23. To one end of lever 133 there is hooked the helical tension spring 96, the other end of spring 96 being hooked to the toe 95 of sector gear 92 as described before. The inner cam surface 134 of lever 133 is urged against the pin 132 holding pivoting arm 131 steadily in either extreme position of two limit positions by means of spring 96, which has its maximum tension in the mid-position of pivoting arm 131. An elongated hole 135 is stamped into the stock of lever 133 through which the shaft 129 freely moves. Two distance bushings 136 and 137 form the necessary shoulders to position the locking lever 133 and a shiftable plate 138 axially on the shaft 129. Between bushing 137 and plate 138 there is positioned an elongated washer 139 having a hole for the shaft 129 and the pivoting pin 132. The plate 138 has two slots 140 and 141, slot 140 being suitable for movement of shaft 129 and slot 141 being suitable for reception of the shaft 89. The annular shoulder of gear 91 and a distance bushing 142 with a washer 143 position axially the other end of plate 138 to the shaft 89. Slots 140 and 141 are curved, the radius of curvature being determined by the distance to the axis of the clock. An aperture 144 is stamped into the shifter plate 138 for the pivoting pin 132. The pivoting pin 132 shifts plate 138 and the guiding slots 140 and 141 move plate 138 arcuately about the axis of the clock. The purpose of plate 138 is to limit the extent of movement of the sector gear 92. The sector gear 92 has a toe 145 struck from the stock of gear 92 and bent perpendicularly thereto. An aperture 146 for the toe 145 is formed in the plate 138.

In Figure 5 the switch is turned off and one mechanism is in initial position. The toe 145 is lying against the inner surface 147 defined by aperture 146 and thus relieving tension on spring 96. The edge 147 keeps the eccentric 88 in that position which keeps discs 61 through the lever in a neutral position between abutments 68 and 71. At this position the aperture 146 permits the sector gear 92 to move, which causes the eccentric 88 to move 360°. That means, referring to Figure 5, the switch is turned "off" and at this position there can be chosen an automatic function from "on" to "off" or a double automatic function from "off" to "on" and then "off." In Figure 6 the shifter plate 138 is shifted to another position by means of pivoting pin 132, with edge 147 pushing toe 145 together with sector gear 92 to another position which causes a 180° motion to eccentric 88, keeping disc 61 again in a neutral position. The exact motion of sector gear 92 causing a 180° motion to eccentric 88 also determines the extent of movement of shifter plate 138.

In Figure 6 the switch is turned "on" and from this position there can be chosen a single automatic switch function from "off" to "on" or a double function from "on" to "off" and then "on."

Means are provided to use this mechanism as a conventional "off"-"on" switch. This junction is made using knob 130 to change switching groups as shown in Figures 5 and 6. By turning the knob 130 from the position as shown in Figure 5 to the position in Figure 6, sector gear 92 causes a 180° motion to eccentric 88, which turns the switch "on" as described before. For changing back the position from Figure 6 to Figure 5, the sector gear 92 must be pulled back to the position as shown on Figure 5. For this purpose a hook 148, formed from sector gear 92, acts in cooperation with pivoting pin 132. In Figure 6 the pin 132, on the way to position illustrated in Figure 5 catches the hook 148 and moves the sector gear 92 about a half way between the two positions. It is necessary to overcome the hindrance of abutment 71 (that is about one third of the way between two positions) and the remaining movement is caused by spring 96. It is necessary that the hook 148 is not hindered by pin 132 by turning sector gear 92 from knob 90 manually or by the automatic action of sector gear 92. Therefore hole 144 has an unsymmetrical shape to give sufficient clearance between pin 132 and hook 148, especially in position as shown on Figure 6.

Means are provided to show the switch position on the clock dial and the number and kind of automatic switch functions predetermined. A scale 149 is provided which shows through the face window 150 and a pointer 151 is provided to indicate the respective color to mark out the position of the switch.

Shifting plate 138 has two toes 152 and 153 bent at right angles from the stock of the plate 138. These toes extend through an opening in frame plates 21 and 22. To the reduced ends of toes 152 and 153 there is secured a color scale 149, this relatively thin piece forming the color scale 149 sitting on the toes 152 and 153.

The frame plate 21 is offset at 154 to provide space between clock dial 24 and frame plate 21, to enable unhindered movement of scale 149 and of pointer 151. This offset portion 154 together with an annular offset rib 155 holds the teeth of the gear 67 in spaced relation from the frame plate 21 and insures good meshing engagement of gear 67 with the pinion gear 81.

Figure 2:
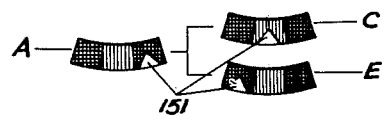
Figure 2 shows in a schematic form the various pointer positions in conjunction with color boxes as seen through the scale window.
Figure 3:
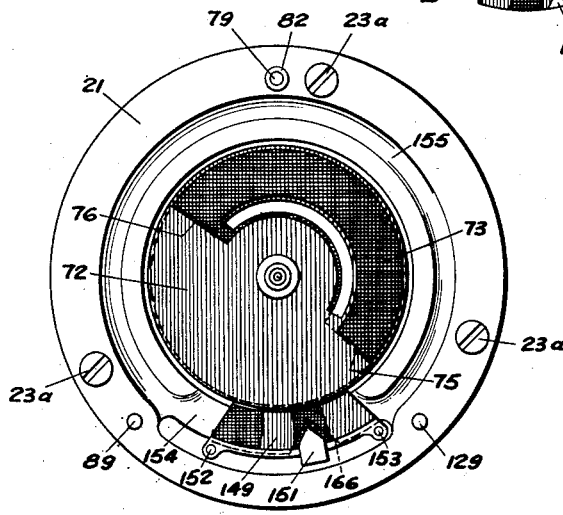
Figure 3 is an elevational view similar to Figure 1 of the timing device, but with the crystal, knobs, frame and clock face removed therefrom.

In the clock face 24 a window 150 is provided which can be simply an aperture or which can be a transparent pane formed from cellophane similar to the circular window 25. The scale 149 is situated behind the window 150 and is coated with colors boxed from left to right preferably in the order: black–red–black–red; as in Figure 3. Only three color boxes can be seen through the window 150. In the position as in Figure 5, the color boxes are shown schematically at A in Figure 2 as black–red–black and in the position of parts as in Figure 6 there can be seen color boxes red–black–red, as shown in Figure 2 and generally designated at B.

Figure 4:
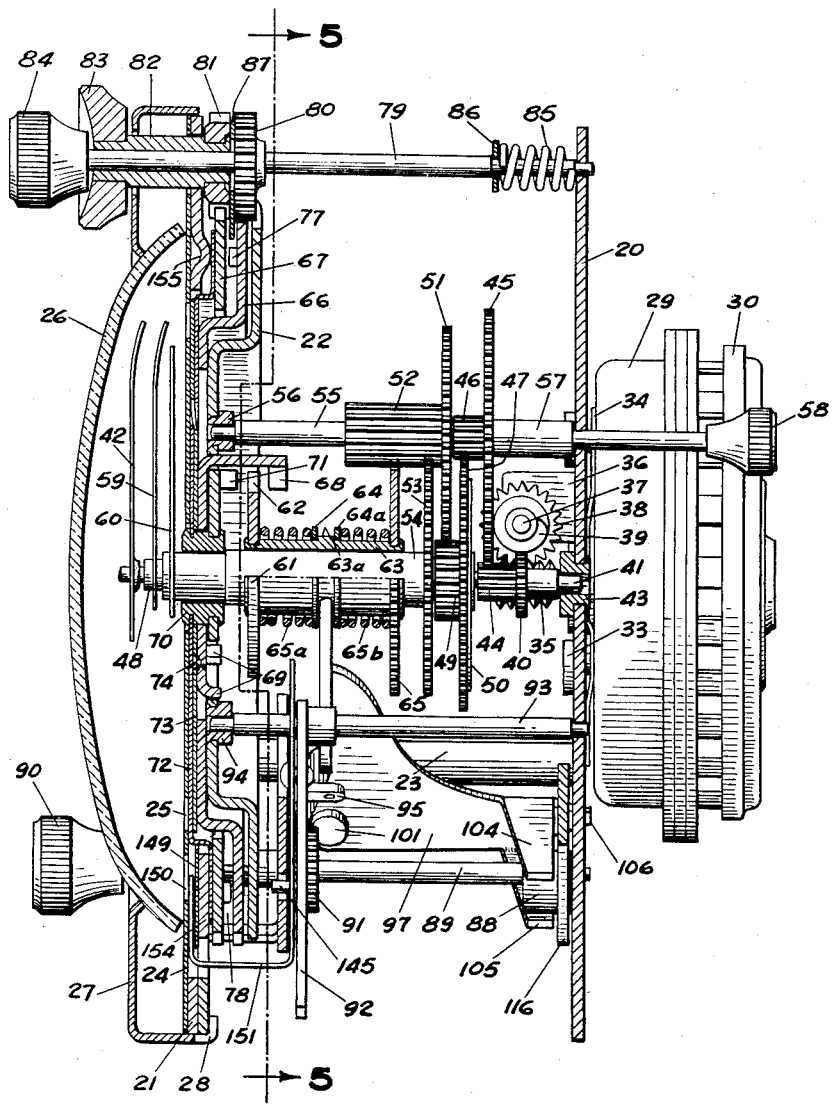
Figure 4 is an enlarged sectional view, taken along the plane of line 4—4 in Figure 5, showing the clockwork, gears with abutments, reciprocating disc and part of the elements of the controlling mechanism.

The pointer 151 is made from relatively thin sheet metal and is bent two times at right angles as shown on Figure 4 and is pivotally secured by a stub rivet 162 to the sector gear 92. An aperture 163 through which the shaft 93 extends permits free movement of the pointer 151 to a certain extent. Another aperture 164 is stamped into the stock of pointer 151 and is suitable to receive a pin 165. The pin 165 is riveted to the stock of shifter plate 138. For mounting purposes an aperture 166 is cut in the frame plate 21 suitable for receiving the tip of pointer 151.

Means are provided to change the relation of pointer 151 and sector gear 92 to designate the function by shifting the shifter plate 138 in such manner so that the tip of pointer 151 shows in either switching group the same three points in relation to face window 150. That means the pointer 151 shows always in the right hand position an initial position (A and B in Figure 2); in its middle position one automatic function (C and D) and in its left hand position two automatic functions (E and F as in Figure 2). For better understanding there can be used number 2 on left hand box, 1 on middle box and 0 on right hand box, which numbers can be printed on the cellophane window 150 (not shown on drawings). Shifting the plate 138 from its position as shown in Figure 5 to position as shown in Figure 6, edge 147 shifts sector gear 92 to the next position causing a manually made switch function. Together with plate 138, pin 165 moves a certain way and at the same time the stub rivet 162 moves. The movement of rivet 162 forming a pivoting point causes motion of pointer 151 in the same direction as the sector gear 92 but movement of pin 167 a reverse movement to the pointer 151. The tip of pointer 151 as shown in Figures 5 and 6 stays exactly in the same place, while the shifter 138 and sector gear 92 are moving from one position to another. The color scale 149, together with plate 138 moves thus providing a new color box under the pointer 151 indicating the switch function completed. The aperture 164 permits free motion of pointer 151 to the extent of three possible positions in each group of switching. The shifting of plate 138, for changing the group of switching, is possible also when the pointer 151 is in a middle or left hand position, herewith the pointer indicates.

The operation of the improved time mechanism is as follows: The synchronous electric motor through the reduction worm gears rotates the shaft of second hand 42 at the rate of 1 R. P. M. Conventional reduction gears of 60 to 1 ratio rotate the minute shaft 48 and a 12 to 1 ratio reduction from minute shaft 48 to hour shaft 54 is obtained. The hands 59 and 60 of the time clock may be manually set as necessary by rotating the knurled knob 58 in either direction. In the operation of the mechanism which causes the desired functions to be performed at predetermined times, the desired times for functional operation are at first adjusted by rotation of knobs 83 and 84 in clockwise or counter-clockwise direction, as desired, to set the color split, 75 and 76 on desired times. The desired initial position "on" or "off" at left side of color scale 149 may be determined by actuating knob 130. The pointer 151 must be turned using knob 90 to a middle position for causing one switch function or to left position for causing two switch functions. The proposed functions can be changed or turned back at any time using knob 90. Thus, by rotation of the knobs 83 and 84, the operator turns a pair of splits 75 and 76 of sector discs 72 and 73 to the desired times. The disc 61 is positioned against an abutment. When the slot 62 of the disc 61, due to its rotation, reaches the abutment, stopping it, the disc moves at first toward this abutment and then back, getting stopped by the other abutment. This is caused by the eccentric which functions to move the disc 61. Concurrently, switch lever 116 causes a switch function. The next function occurs in exactly the same way.

In Figure 1 if pointer 151 is turned to left hand position at E in Figure 2, the first automatic switch function will occur at 4:30, switch will be turned "on" and pointer 151 shall jump to middle position indicating the color red. At 10 o'clock hour hand 60 arriving at the black color, the switch will be turned "off" and pointer 151 jumps to end position or right hand indicating the color black.

The presetting of the mechanism, as described before, can be made from the position shown in Figure 5 by turning knob 90, pointer 151 together with sector gear 92 will have turned to the left hand position, spring 96 will have tensioned and eccentric 88 rotates 360° causing two reciprocating periods to disc 61 while eccentric 88 operates the switch two times. Disc 61 is thus pushed against abutment 71, the hindrance of abutment 68 being overcome by means of spring 65a and the hindrance of abutment 68 is overcome by means of spring 65b and the mechanism stays in this position, pointer 151 staying in a left hand position indicating a black color, disc 61 being stopped by abutment 68, which is in connection with black colored sector disc 73 and with the switch being turned off. The mechanism stays in this position until slot 62 of disc 61 (the slot 62 moving in same radial line with hour hand 60) reaches the stopping abutment 68 (in same radial line with the split 75 of black sector disc 73). At the same time the hour hand 60 reaches the split 75 of black disc 73, the slot 68 reaches the abutment 68 which was stopping it. During the next half period of reciprocating motion the disc 61 moves toward the abutment 68 which was holding it and then toward the other abutment 71. During this motion eccentric 88 moves 180° causing the switch actuating lever 116 to move which frees the knob 120 of the micro-switch and connects the contacts 121 and 123 of the micro-switch. The second automatic switch function will occur exactly the same way with the exception that the disc 61 stays there after in a neutral position between abutments 68 and 71. That is caused by the toe 145 positioned against the edge 147, which holds sector gear 92 in a position causing necessary eccentric position keeping disc 61 neutral without letting the abutments 68 and 71 hinder the rotation of disc 61 by usual clockwork.

Figure 9:
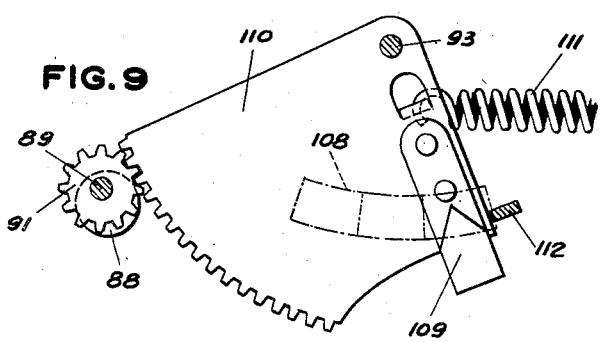
Figure 9 is an enlarged view of an alternative form of the actuating mechanism.
Figure 10:
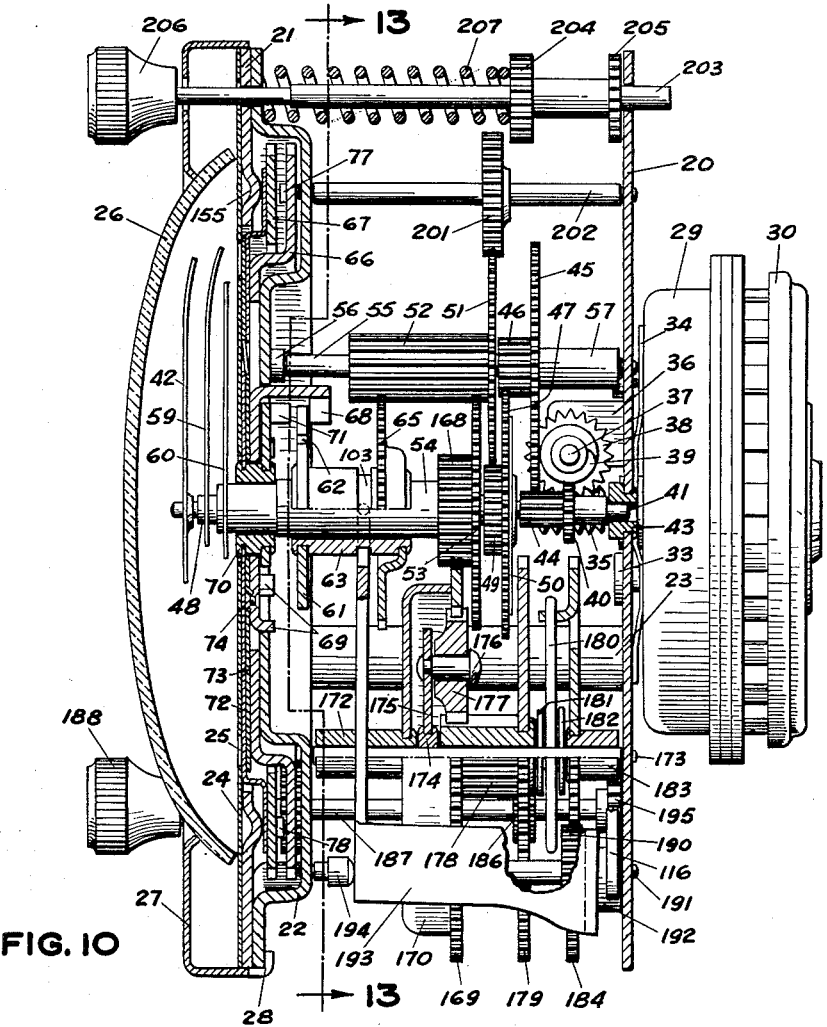
Figure 10 is an enlarged section view taken along the plane of line 10—10 in Figure 13, showing a modified form of the clockwork and reciprocating disc with the lock and the gear train.

Referring now to Figure 9, it will be noted that a modified form of actuating mechanism for the switching program is illustrated. This modified form is especially adapted for use where the switching program is predetermined. The program changing mechanism including shifting plate 138, knob 130, and associated parts can be eliminated. In this form of the invention instead of a movable scale 149 there is a stationary scale 108 as shown in dotted lines. The pointer 109 is riveted to the sector gear 110 provided in lieu of sector gear 92. The sector gear is held in an end position leaving disc 61 neutral between abutments 68 and 71 by means of a stationary stop piece 112 struck out from plate 22. The sector gear 110 is actuated by a spring 111 similar to spring 96.

The other form of the invention is quite similar to the first embodiment in construction and operation and is illustrated in Figures 10–15. The difference in operation resides in the fact that the device makes continuously two switch functions in a clock dial period at predetermined times without requiring manual tensioning of any spring. The function causing spring here is tensioned directly by the clockwork. A spring is actuated at one end by clockwork in a dial period so as to cause a 360° motion to an eccentric, the latter actuated by the other end of this spring in a same clock dial period with a similar amount of energy.

The front view of this type clock is the same as shown in Figure 1 with the omission of the face window 150. The setting knobs are located in same positions but have different uses and instead of the upper double knob 83, 84 there is a single knob 206.

The framework, synchronous motor, reduction gears with hands, ring gears with abutments and the function causing disc are identical with the structures as described in first form of the invention and therefore identified by the same reference numerals.

A pinion gear 168 is secured concentrically about the hollow shaft 54 in mesh with a ring gear 169 having external and internal teeth. An annular connecting box 170 is secured to the ring gear 169. The connecting box 170 has a series of toes which extend through holes 171 in the stock of ring gear 169 holding the connecting box 170 to the ring gear 169. A central aperture is formed in box 170 and there is secured therein a hollow shaft 172. The ring gear 169 is mounted on a shaft 173 within shaft 172. The diametrically reduced ends of the shaft 173 are journalled in the frame plates 20 and 22, keeping shaft 173 axially positioned therebetween. To the shaft 173 there is secured a hub 174 to which there is secured an annular plate 175. On a stub shaft 176 secured to the plate 175, there is mounted a planet gear 177 in mesh with the internal teeth of ring gear 169 and a sun gear 178, the latter journalled freely to the shaft 173. A gear 179 is secured to the sun gear 178. A spiral spring 180 is secured to the shaft 173 and extends through an aperture in the shaft 173. Two washers 181 and 182 in either side of the spring 180 form shoulders, the washer 181 keeping the gear 178 axially positioned and the washer 182 holding the hub 183 axially positioned on the shaft 173. To the hub 183 there is secured a gear 184 having same size and number of teeth as gears 169 and 179, the hub 183 being freely journaled to the shaft 173. The stock of gear 184 has a toe 185 struck out and bent perpendicularly thereto, which toe, 185 is provided with a hole for holding the outer end of spring 180.

Figure 11:
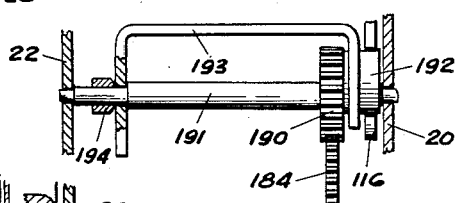
Figure 11 is an enlarged view of the modification showing the eccentric and the lock on the shaft of the eccentric being shown partly in section for greater detail.
Figure 12:
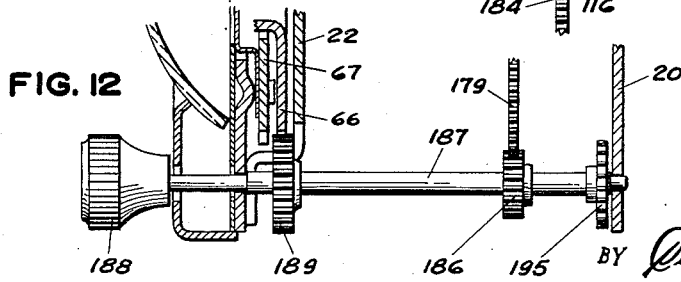
Figure 12 is an enlarged sectional detail view showing the shaft with its knob and associated gears.
Figure 13:
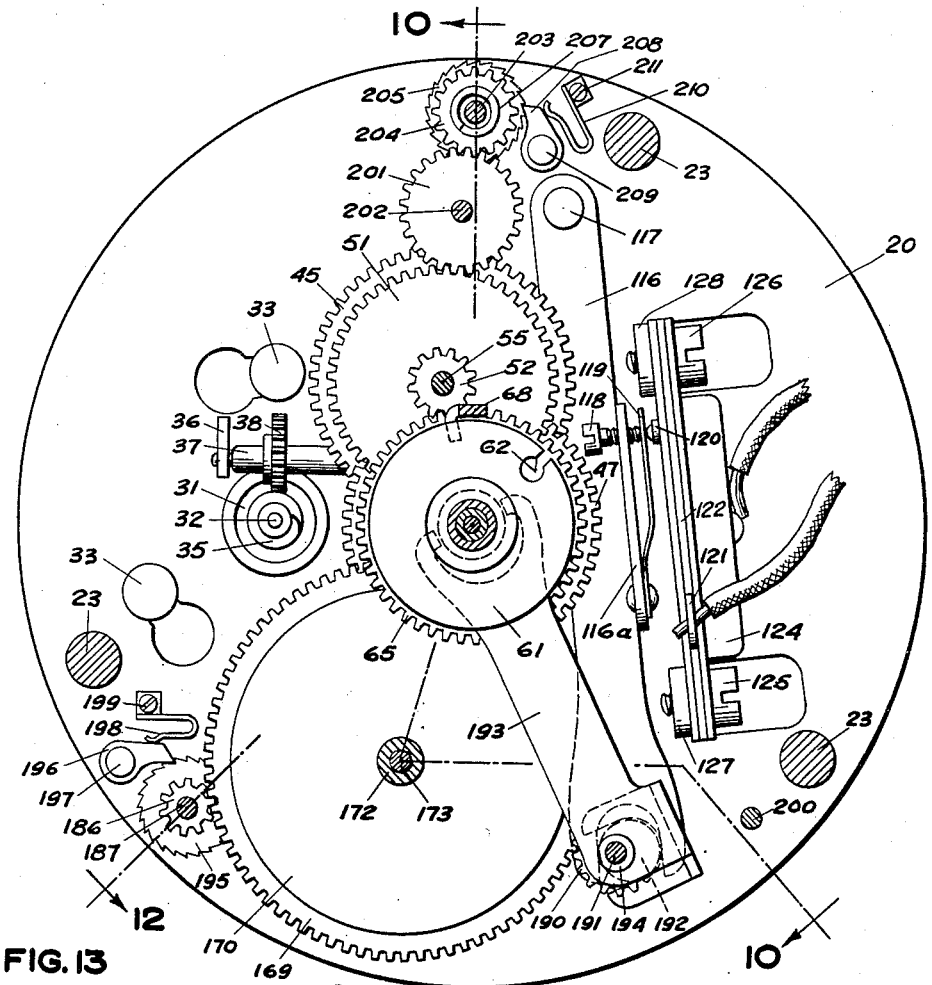
Figure 13 is an enlarged sectional view taken along the plane of line 13—13 in Figure 10.
Figure 14:
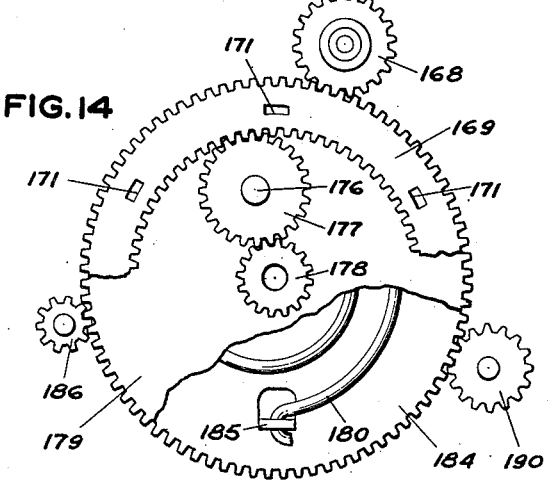
Figure 14 is an enlarged view of the spring actuating gear train shown partly fragmentarily.
Figure 15:
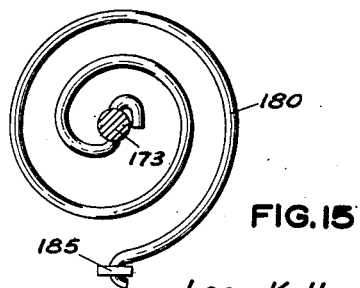
Figure 15 is an enlarged view showing the function actuating spring.

The gear 179 meshes with a pinion gear 186 which is secured to a shaft 187 extending between and journaled in frame plates 20 and 21. One end of shaft 187 extends through the glass holding ring 27 and carries a knurled knob 188 for manual setting. A pinion gear 189 is secured to the shaft 187 for rotating the ring gear 66 so as to preset the time of switch function. The gear 184 meshes with a gear 190 which is secured to a shaft 191 extending between and journalled in frame plates 20 and 22. An eccentric 192 is secured on the shaft 191 close to the gear 190, the eccentric 192 reciprocating a lock lever 193 and the switch lever 116. The operation of the micro-switch is same as in first form of the invention. The lock lever 193 is a one piece solid lever, formed from sheet metal. The forked end of the lever engages the shaft 63 within the groove 103 and the eccentric end of the lever 193 embraces the eccentric 192. The lock lever 193 is pivotally secured to the shaft 191, as shown in Figure 11. The lock lever 193 freely sits on the shaft 191 and for axially positioning of the lever 193 there are provided two shoulders for lock lever 193 one shoulder rotatably positioned about shaft 191, the other shoulder having a bushing 194 pressed therein. This permits the necessary small angular pivoting of lock lever 193 and also permits free rotation of shaft 191 so as to enable this structure to be very cheaply manufactured.

As described before, two automatic functions are caused by eccentric 192 in one dial period, the eccentric 192 rotating 360° in this period. To cause these automatic functions spring energy is freed causing the 360° rotation of eccentric 192. To keep the spring 180 permanently tensioned the clockwork within a dial period must actuate the spring 180 to restore the energy lost during this period. Thus, the direction of rotation of one abutment (68 or 71) must be counter-clockwise. The other abutment can be rotatably adjusted in both directions because its rotation is limited to 360° and thus cannot cause a loss of energy in spring 180. Means are provided to limit the rotation of ring gear 169 in a counterclockwise direction only, using a ratchet wheel 195 secured to the shaft 187. A locking pawl 196 is pivotally mounted on a stub shaft 197 which is riveted to the frame plate 20. A spring 198 is secured to the frame plate 20 by a screw 199 which holds the pawl 196 yieldingly against the ratchet wheel 195 permitting only clockwise rotation of the shaft 191. For rotating the ring gear 67 another shaft 200 is provided having a gear and knob similar to gear 189 and knob 188 and is used for presetting abutment 71 in both directions of rotation to the extent of 360° with respect to the gear 66. On the drawings there is shown only the location of the shaft 200. The direction of manual time setting must be determined and the clock hands are allowed to be rotated in a clockwise direction.

An idler gear 201 is secured to a shaft 202 both ends of which are reduced diametrically and journalled in the frame plates 20 and 22. A shiftable shaft 203 has secured thereto a gear 204 and a ratchet wheel 205, one end of this shaft 203 extending through the frame plate 20 and the other reduced end thereof extending through frame plates 21 and 22 and glass holding ring 27. To the reduced end there is secured a knurled knob 206 for manual time setting purposes. The ratchet wheel 205 is pressed against the frame plate 20 by pulling the knob 206 out, the gear 204 meshes with the gear 201 engaging the train of gears so as to rotate the minute hand 59 and hour hand 60. The ratchet wheel 205 permits the rotation of clock hands only in a clockwise direction as is necessary. A locking pawl 208, pivoting on stub shaft 209 is pressed against the ratchet wheel 205 by means of a spring 210 secured to the frame plate 20 by means of a screw 211. The locking pawl 208 must be big enough to permit axial shifting of shaft 203 while continuously staying in engagement with the ratchet wheel 205 after the manual setting spring 207 again disengages the gears 201 and 204.

The operation of the spring tensioning mechanism is as follows: After adjusting the desired times for switch functions, the sun gear 178 stays in a permanent position. Gear 168 is rotated by the clockwork in same ratio as disc 61. The gear 168 rotates the ring gear 169, the internal teeth of which are rotating the gear 177 which meshes with sun gear 178. The shaft 173 is thus rotated a certain ratio by clockwork. That causes within a dial period a delivery of energy to the spring 180 which is actuated by the clockwork a certain amount, thus causing a 360° rotation of the eccentric 192. The delivery of energy by the spring 180 to the eccentric 192 is used to cause two switch functions occuring in this period.

Upon turning the knob 188, the pinion gear 189 turns gear 66 with abutment 68 and in a dial period (360°) there always occurs two switch functions, no matter where the other abutment is. On the shaft 187 the pinion gear 186 turns the gear 179 together with its companion gear 178 which meshes with the idler gear 177. By turning the knob 188 the train of gears turns the gear 178 and the latter turns the idler gear 177. The idler gear 177 being in mesh with internal teeth of gear 169 rotates as does the shaft 173. The ratio of gear train is selected so as to cause during a dial period the same rotation of the shaft 173 in direction and amount as was made by clockwork during a dial period. That means that within a dial period the shaft 173 is rotated a certain amount no matter whether this rotation is caused by clockwork or by presetting of the abutment.

The operation of this improved time switch is as follows: The operator turns the color splits 75 and 76 of sector discs 72 and 73 to the desired times. The disc 61 is positioned against an abutment and is holding the tension in spring 180. When the slot 62 of disc 61 reaches the abutment stopping it, the disc moves at first toward this abutment and then back, getting stopped by the other abutment, as in first form of the invention. This motion is caused by the eccentric 192 which rotates 180° to move the disc 61. Concurrently switch lever 116 causes a switch function. The next functions occur in exactly the same way. During the next dial period the clockwork accumulates energy which is delivered to the spring 180 amount equal to that used for rotating the eccentric 192 during a dial period enabling the switch functions to occur continuously, two functions in each dial period without deenergizing the spring 180.

The mechanism, described in these two variations can be built on any time driven shaft, and especially in the second form it might be necessary to build the mechanism on an hour shaft, showing the 24 hours within each dial period. For this modification instead of the 12 to 1 reduction gears there must be provided gears with a reduction ratio of 24 to 1.

Since numerous modifications will readily occur to those skilled in the art, it is not intended to limit the invention to the precise embodiments shown and described but all suitable modifications and equivalents may be readily resorted to.

What is claimed as new is as follows:

1. An automatic time switch in combination with a clockwork having a casing and having a pair of concentric rotating shafts journalled in said casing, said time switch including a pair of gears rotatably mounted about said shafts, a colored annular disc on each of said gears, each of said discs having a radially extending split therein receiving a portion therethrough of the other of said discs, means engaging said gears for adjustably rotating and positioning each of said gears to adjust and position said colored discs with respect to each other, stop pieces secured to said gears engageable with each other limiting the relative rotation of said gears with respect to each other to substantially 360°, abutments on said gears, a driven shaft slidably mounted about said concentric shafts driven by said clockwork, a time driven disc mounted on said driven shaft, said time driven disc having a slot therein, means for reciprocating said time driven disc, said abutments intermittently lockingly engaging said time driven disc, said abutments passing through said slot in said time driven disc when said abutments are in alignment with said slot, electrical contact points in said casing, and a mechanism associated with said means for reciprocating said time driven disc for actuating said contact points, said mechanism being responsive to the position of said abutments.

2. The time switch of claim 1 wherein said means for reciprocating said disc include a fork lever, an eccentric connected to said fork lever for moving said fork lever, a shoulder, a pair of washers on said driven shaft abutting said shoulder, said fork lever engaging said driven shaft between said washers, and resilient members resiliently yieldingly engaging said washers and said time driven disc.

References Cited in the file of this patent

UNITED STATES PATENTS

| | | |
|---|---|---|
| 1,495,020 | Hall | May 20, 1924 |
| 2,004,137 | Smith | June 11, 1935 |
| 2,032,774 | Smith | Mar. 3, 1936 |
| 2,398,015 | Leathers | Apr. 9, 1946 |
| 2,421,986 | Bohman | June 10, 1947 |
| 2,508,896 | Smith | May 23, 1950 |
| 2,545,617 | Kaefer et al. | Mar. 20, 1951 |
| 2,587,026 | Beiser | Feb. 26, 1952 |